US012687443B2

(12) United States Patent
Reed et al.

(10) Patent No.: US 12,687,443 B2
(45) Date of Patent: Jul. 21, 2026

(54) REAL-TIME BELT TENSION SENSING SYSTEM

(71) Applicant: Dematic Corp., Grand Rapids, MI (US)

(72) Inventors: Michael Reed, Fremont, MI (US); Paul E. Berna, Allendale, MI (US); Daniel Houchin, Lawton, MI (US); Brad Warmuskerken, Grand Rapids, MI (US); Chris Botsis, Grand Rapids, MI (US); Mark Almas, II, Grand Rapids, MI (US); Anthony Miller, Comstock Park, MI (US); Terry Cruzan, Grand Rapids, MI (US); Barry W. Weddle, Jr., Kentwood, MI (US); Aaron Fankhauser, Lewisville, TX (US); Taylor Stults, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 502 days.

(21) Appl. No.: 18/174,057

(22) Filed: Feb. 24, 2023

(65) Prior Publication Data

US 2023/0266189 A1 Aug. 24, 2023

Related U.S. Application Data

(60) Provisional application No. 63/313,385, filed on Feb. 24, 2022.

(51) Int. Cl.
*G01L 5/107* (2020.01)
*G01L 5/08* (2006.01)
(Continued)

(52) U.S. Cl.
CPC ................ *G01L 5/107* (2013.01); *G01L 5/08* (2013.01); *G01L 5/10* (2013.01); *G01L 5/108* (2013.01)

(58) Field of Classification Search
CPC ......... G01L 5/105; G01L 5/106; G01L 5/107; G01L 5/108; G01L 5/06; G01L 5/08; G01L 5/10
See application file for complete search history.

(56) References Cited

U.S. PATENT DOCUMENTS

| | | |
|---|---|---|
| 5,657,941 A | 8/1997 | Simons et al. |
| 2010/0029421 A1 | 2/2010 | Mc Donald et al. |

(Continued)

FOREIGN PATENT DOCUMENTS

| | | | |
|---|---|---|---|
| CN | 212693034 U | * | 3/2021 |

OTHER PUBLICATIONS

International Search Report and Written Opinion from corresponding Patent Cooperation Treaty (PCT) Application No. PCT/IB2023/051740, completed Apr. 26, 2023.

*Primary Examiner* — Paul M. West
(74) *Attorney, Agent, or Firm* — Gardner, Linn, Burkhart & Ondersma LLP

(57) ABSTRACT

A real-time belt tension sensing system includes an engagement assembly that is adapted to remain in substantially continuous contact with a belt that is being driven in a conveyance or drive direction. As the belt is driven in the drive direction, it simultaneously causes the position of the engagement assembly to move in a slack direction that is substantially perpendicular to the drive direction. A tension sensor produces a slack position signal based on the current position of a portion of the engagement assembly. The slack position signal is transmitted to a controller or control circuit in electronic communication with the tension sensor. The control circuit interprets the slack position signal to produce a tension measurement.

20 Claims, 4 Drawing Sheets

(51) Int. Cl.
    *G01L 5/10*        (2020.01)
    *G01L 5/108*     (2020.01)

(56)             References Cited

U.S. PATENT DOCUMENTS

| | | |
|---|---|---|
| 2014/0309882 A1 | 10/2014 | Antchak et al. |
| 2015/0360875 A1 | 12/2015 | Tout et al. |
| 2017/0138445 A1 | 5/2017 | Farewell et al. |
| 2019/0054749 A1* | 2/2019 | Kanno ............... G03G 15/1615 |
| 2021/0206184 A1* | 7/2021 | Tanaka .................... G01L 5/108 |
| 2021/0372883 A1 | 12/2021 | Frost et al. |

* cited by examiner

REAL-TIME BELT TENSION SENSING SYSTEM

CROSS REFERENCE TO RELATED APPLICATION

The present application claims priority of U.S. provisional application Ser. No. 63/313,385, filed Feb. 24, 2022, which is hereby incorporated herein by reference in its entirety.

FIELD OF THE INVENTION

The present invention relates generally to a system for measuring belt tension, and is particularly adapted for measuring the tension of a belt used in a conveyance system.

BACKGROUND OF THE INVENTION

Conveyance systems are provided in various formats to transport an object from one location to another and commonly include roller conveyors driven by narrow belts and belt conveyors with wide, flat belts driven by motorized rollers. To improve efficiency and increase the longevity of the conveyance system, the belts used in the conveyance system should be maintained at a proper belt tension. For example, under-tensioned belts may lead to belt slippage, a loss of conveyance, and additional wear and tear on other components of the conveyance system. Alternatively, over-tensioned belts can cause excessive belt strain and may similarly result in additional wear and tear on other components of the conveyance system. It is common practice to stop the conveyance system and manually check the belt tension with separate tool, such as a belt frequency meter. Replacement and/or adjustment of belts requires stoppage of the conveyance system, thereby causing significant downtime.

SUMMARY OF THE INVENTION

A belt tension sensing system provides real-time feedback of a belt's tension while the belt is being driven. The system includes an engagement assembly that remains in substantially continuous contact with the belt while the belt is driven in a conveyance or drive direction. As the belt is driven, it vibrates, bounces, shutters, and/or oscillates, and as such, the belt urges a portion of the engagement assembly to move in a slack direction that is generally perpendicular to the drive direction. A tension sensor of the system produces a slack position signal based on the position of the engagement assembly in the slack direction. The slack position signal is interpreted by a controller, such as a control circuit to produce a tension measurement that may be reviewed and monitored by authorized personnel and/or automated equipment.

According to an embodiment of the present invention, a belt tension sensing system includes a sensor, such as a tension sensor, that is coupled to an engagement assembly. The engagement assembly is configured to contact a belt driven in a conveyance or drive direction. As the belt oscillates, it displaces or urges the engagement assembly to move in a slack direction that is substantially perpendicular to the drive direction. The sensor produces a slack position signal based on a position or current position of the engagement assembly in the slack direction. The slack position signal is then transmitted to a control circuit, which is in electronic communication with the sensor. The control circuit interprets the slack position signal to produce or calculate a tension measurement of the belt.

In one aspect, the engagement assembly includes an idle roller that is coupled to a roller link. The idle roller provides an interface between the engagement assembly and the belt and remains in substantially continuous contact with the belt as the belt is driven. In particular, the idle roller remains in substantially continuous as the belt oscillates or shutters relative to the drive direction.

In another aspect, the sensor may include or comprise a pressure sensor having a resilient member coupled between a fixed end and a moving end of the transducer. The fixed end remains stationary while the moving end moves synchronously with the roller link. Alternatively, the sensor may be provided in the form of an infrared sensor, an optical sensor, a laser sensor, or a magnetic sensor, such as a Hall Effect sensor.

In yet another aspect, multiple slack position signals may be produced by the tension sensor and transmitted to the control circuit. For example, the sensor may record intermittent slack position signals as the belt is driven. A tension measurement may then be produced or calculated based on the slack position signals. In still another aspect, a continuous slack data string may be produced by the sensor. The slack data string includes a multitude of slack position signals recorded in close succession with one another (i.e. substantially continuously). The slack data string is transmitted to and interpreted by the control circuit to produce a continuous tension measurement data string. The tension measurement data string may be calculated based on a rolling average of a subset of slack position signals contained within the slack data string, for example.

Thus, the belt tension sensing system of the present invention enables real-time and continuous tension measurement of a belt, such as a belt in a conveyance system, without having to shut down the conveyance system to obtain a manual belt tension measurement. The position of an engagement assembly—remaining in substantially continuous contact with a belt driven in a drive direction—is moved or displaced by the belt when the belt moves in the slack direction. A tension sensor produces a slack position signal based on the position of the engagement assembly. The slack position signal is transmitted to a control circuit where it is interpreted to produce a tension measurement representing a relative tension within the belt.

These and other objects, advantages, purposes and features of the present invention will become apparent upon review of the following specification in conjunction with the drawings.

DETAILED DESCRIPTION OF THE PREFERRED EMBODIMENTS

Figure 1:
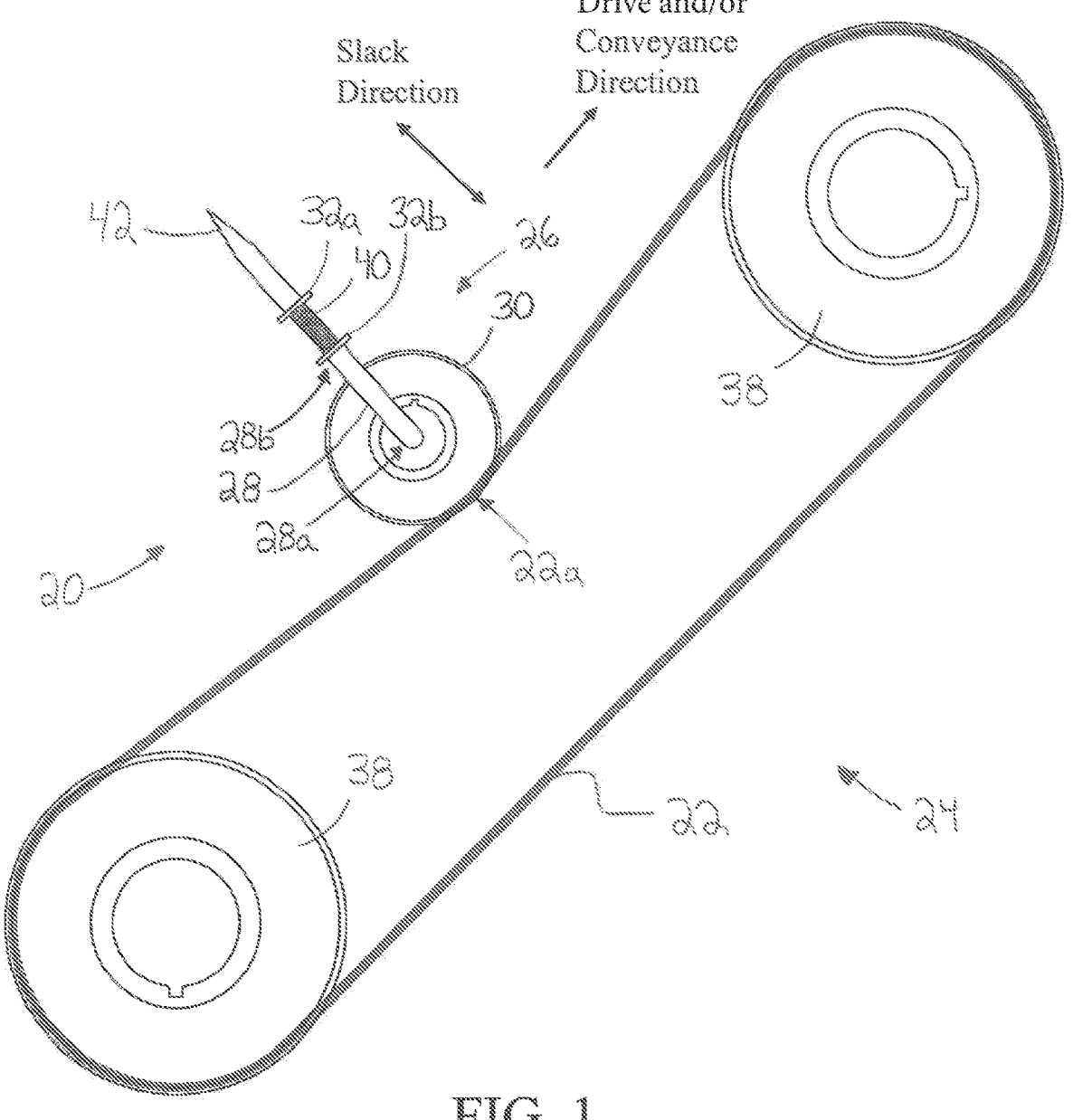
FIG. 1 is a front elevation view of a belt tension sensing system in accordance with the present invention.
Figure 2:
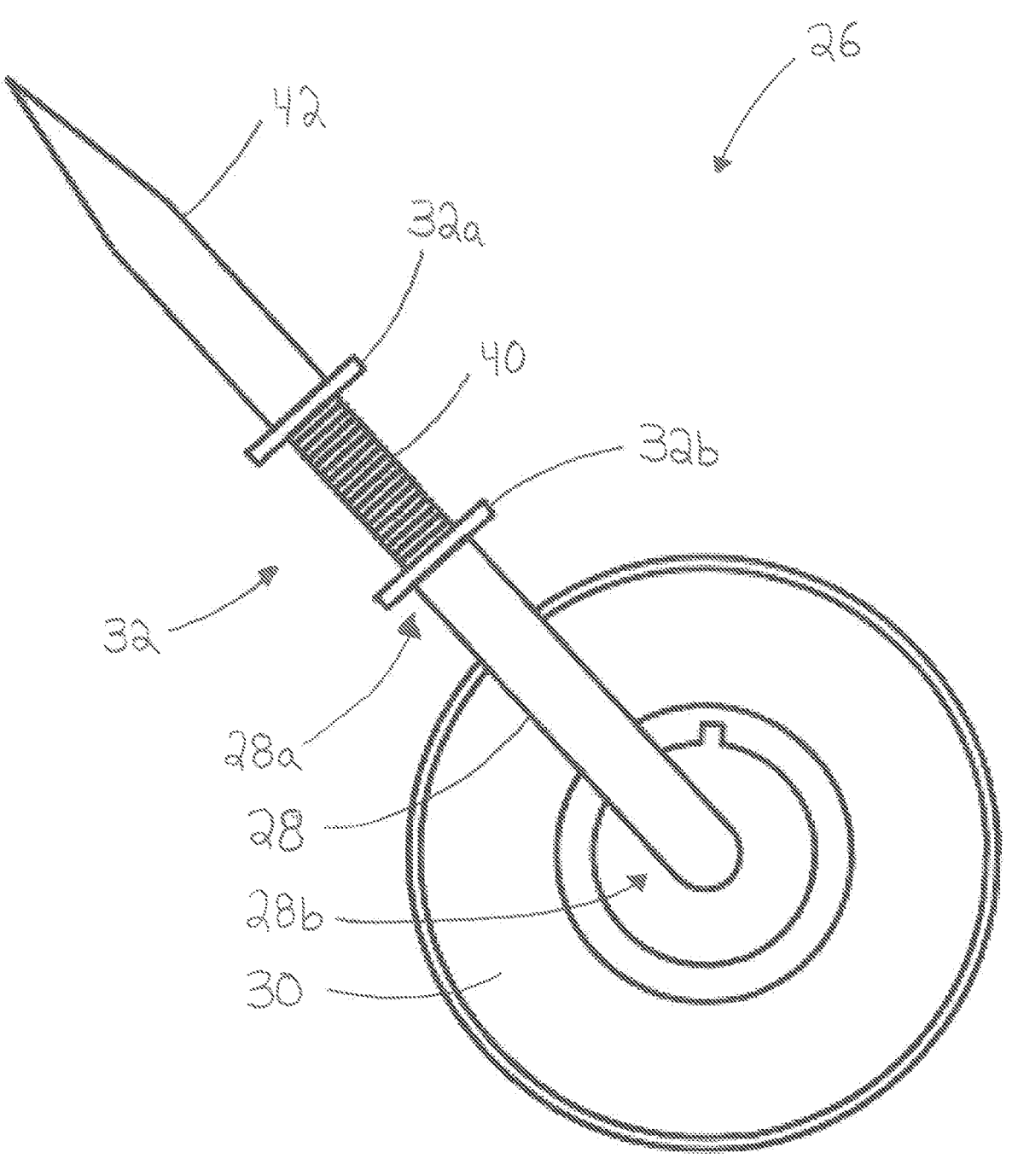
FIG. 2 is an enlarged front elevation view of an idle roller of the belt tension sensing system of FIG. 1, depicted in isolation from the sensing system.

The present invention will now be described with reference to the accompanying figures, wherein the numbered elements in the following written description correspond to like-numbered elements in the figures. A belt tension sensing system 20 is adapted to measure the tension of a belt 22, such as while belt 22 is being driven in a conveyance or drive direction during the operation of a conveyance system 24 (FIG. 1). In this way, belt tension sensing system 20 is particularly beneficial for reducing costly downtime resulting from the need to stop belt 22, and therefore conveyance system 24, in order to take tension measurements of belt 22. Moreover, because belt tension sensing system 20 allows tension data to be continuously collected and monitored, personnel responsible for maintaining conveyance system 24 can better forecast when tension adjustments to belt 22 are necessary, which may substantially reduce or eliminate more severe and costly issues from occurring as a result of improper belt tension. Belt tension sensing system 20 includes an engagement assembly 26 having a roller link 28 with a proximal end 28a coupled to an idle roller 30 (FIGS. 1 and 2). Idle roller 30 is positioned such that it remains in substantially continuous rolling contact with belt 22 as it is driven in the drive direction. As belt 22 is driven, it vibrates, bounces, shutters, and/or oscillates, and as such, the belt 22 urges or causes engagement assembly 26 to move in a slack direction that is substantially perpendicular to the drive direction. A sensor or tension sensor in the form of a pressure transducer or pressure sensor 32 is connected to a distal end 28b of roller link 28. The sensor 32 produces a slack position signal 34a based on the position of a portion of the engagement assembly 26, such as the position of the roller link 28 and/or idle roller 30 (FIGS. 1 and 2). Multiple slack position signals 34a are transmitted to a controller, such as a control circuit 36, in the form of a slack data string 34. Control circuit 36 interprets slack data string 34 to produce a tension measurement that may be transmitted to external devices, such as a computer of a warehouse control system.

Referring now to the illustrated embodiment of FIGS. 1 and 2, conveyance system 24 includes a pair of motorized rollers 38 that drive or rotate belt 22 in the drive direction. A resilient member in the form of compression spring 40 imparts a biasing force to idle roller 30 via roller link 28 to bias idle roller 30 towards belt in the slack direction 22. This arrangement ensures that idle roller 30 remains in substantially continuous or constant contact with a contact portion 22a of belt 22. For example, the idle roller 30 adjusts automatically if a sudden load is applied to or removed from the belt 22 that causes the position of contact portion 22a to move toward or away from the engagement assembly in the slack direction. Spring 40 is coupled between a fixed end 32a and a moving end 32b of pressure sensor 32. Fixed end 32a is coupled to a non-moving object, such as support bar 42, which may be coupled to a frame of the conveyance system 24, to ensure that fixed end 32a remains in a substantially non-moving or stationary position. Moving end 32b is coupled to distal end 28b of roller link 28. Roller link 28 and idle roller 30 are substantially rigid such that any movement of contact portion 22a of belt 22 in the slack direction causes substantially identical movement of both idle roller 30 and roller link 28. Accordingly, moving end 32b of pressure sensor 32 moves in a substantially identical and/or synchronous manner with the roller link 28, idle wheel 30, and contact portion 22a of belt 22. It should be appreciated that a tension sensor could be located at alternative locations while remaining within the scope of the present invention. For example, a tension sensor could be coupled between a proximal end of a roller link and an idle roller, or could be incorporated into the idle roller itself and still produce slack position signals. While the belt 22 and conveyance system 24 are described herein as a conveyor surface belt driven by motorized rollers 38, it will be appreciated that the belt tension sensing system 10 may be adapted to measure and monitor the tension in various forms of belts. For example, the belt tension sensing system 10 may be provided with a roller conveyor that is driven by one or more drive belts, such as a cogged belt driven roller conveyor. The idle roller 30 may be shaped and dimensioned to contact or rest against various types of belts, including conveyor surface belts 22, v-belts, double v-belts, cogged belts, and the like.

Figure 3:
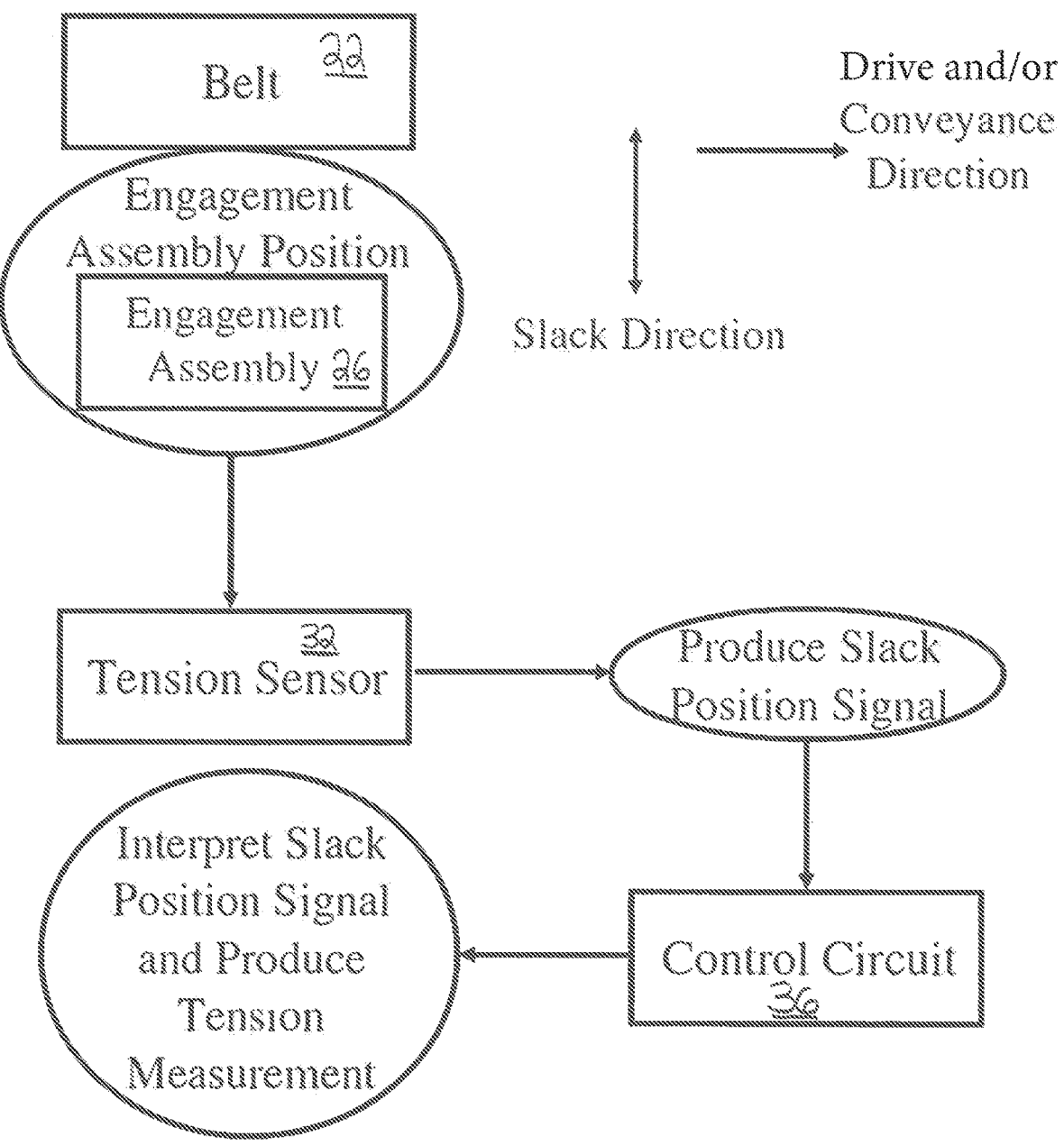
FIG. 3 is a flowchart representation of the components and operations of the components of the belt tension sensing system of FIG. 1.
Figure 4:
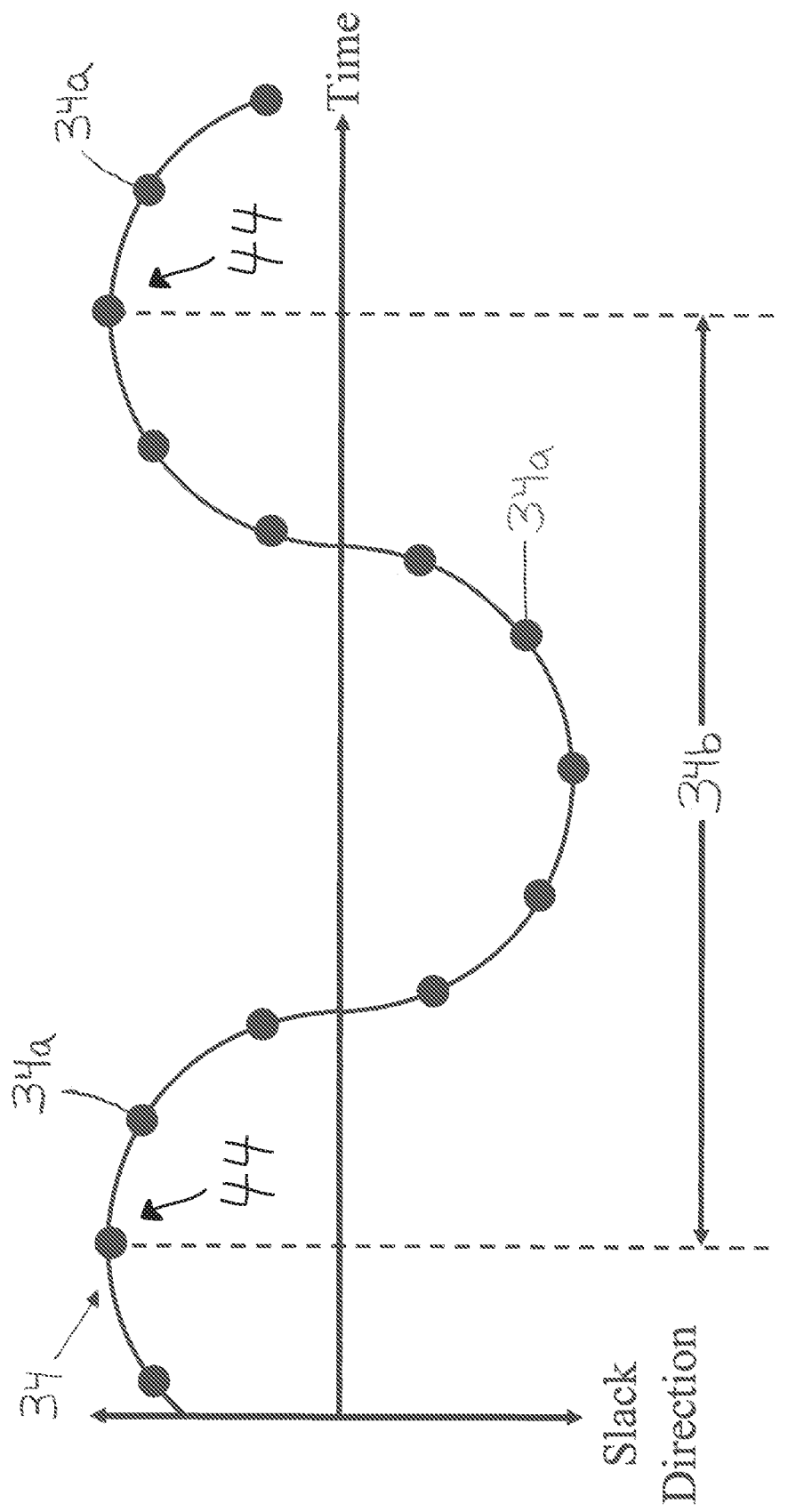
FIG. 4 is a graphical representation of a slack data string formed of a plurality of slack position signals produced by a tension sensor of the belt tension sensing system of FIG. 1.

Referring now to FIGS. 3 and 4, pressure sensor 32 is operable to produce, create, or otherwise output a slack position signal 34a based on the position of moving end 32b of the transducer 32 relative to fixed end 32a. As described above, the position of moving end 32b is determined by the position of the roller link 28, idle roller 30, and/or contact portion 22a of belt 22 in the slack direction. Pressure sensor 32 may determine the distance between fixed end 32a and moving end 32b through various methods. For example, a variable resistor, such as a potentiometer or rheostat, could be electrically connected between fixed end 32a and moving end 32b such that the electrical resistance of the variable resistor would change in relation to changes in the distance between fixed end 32a and moving end 32b. In this context, the electrical resistance and/or other electrical properties dependent on the electrical resistance of the variable resistor may be utilized or manipulated to generate or produce the slack position signal 34a. Slack position signal 34a may then be transmitted to control circuit 36, which is in electronic and/or wireless communication with pressure sensor 32. Pressure sensor 32 may also continuously produce and transmit slack position signals 34a that collectively form slack data string 34.

After receiving one or more slack position signals 34a and/or slack data string 34 as input, control circuit 36 analyzes and interprets this data to produce a tension measurement and/or plurality of tension measurements that form a tension measurement data string. Control circuit 36 may contain or be incorporated into a microcontroller, microprocessor, or other electronic computational device. Various methods can be implemented or used to interpret slack data to produce tension data. For example, as shown in FIG. 4, a subset 34b of slack position signals 34a in slack data string 34 may be sampled to analyze the distance between two peaks 44 of the slack data string 34 as a function of time to calculate the tension in belt 22. Belt tension generally increases inversely relative to the distance, as a function of time, between adjacent peaks 44. That is, the less time there is between peaks 44, the more belt tension there is, and vice versa. Control circuit 36 may sample subsets of varying sizes within slack data string 34, and may calculate tension measurements based on a rolling average of data, such as one or more subsets of slack data string 34 and/or previously calculated tension measurements. It should be appreciated that other methods for calculating belt tension or otherwise interpreting slack data string 34 may also be used instead of or in addition to the above-described method within the scope of the present invention. For example, control circuit 36 may employ routines that reduce the "noise" in slack data string 34 to better locate peaks 44 and to filter out potentially low quality data points.

After slack data string 34 has been interpreted, the resulting tension measurement data may be transmitted to one or more external devices, such as a computer monitored by authorized personnel charged with maintaining conveyance system 24. Control circuit 36 may also be incorporated into such a computer. Furthermore, the tension measurement data may also be reformatted, adjusted, and/or converted into a suitable format to be propagated over a network, such as a network containing industrial internet of things (IIoT) monitoring tools that may provide additional data analysis.

It should be appreciated that the various components of belt tension sensing system 20 and their relation to one another may vary within the scope of the present invention. For example, a sensor may take other forms that include but are not limited to a magnetic sensor, such as in the form of a Hall Effect sensor, an infrared sensor, a laser sensor, or an optical sensor. Additionally, an engagement assembly may maintain contact with belt 22 via one or more alternative components, such as a roller component in the form of a ball bearing assembly, which may be connected to a shock absorbing link. The tension measurement data described above could also be incorporated into or used in a system that may automatically adjust belt tension with little to no human interference and/or without having to shut down a conveyance system.

Accordingly, the belt tension sensing system may provide a timesaving and cost-effective way to measure the tension of a belt while the belt is being driven and/or while the conveyance system is disabled. An engagement assembly is positioned and biased into constant contact with the belt such that the movement and position of the engagement assembly is determined by the movement and position of the belt. A tension sensor is attached to the engagement assembly and outputs a slack position signal based on the position of the engagement assembly. The slack position signal is interpreted by a control circuit to produce a tension measurement that may be propagated across networks and/or other external computing devices for review and monitoring purposes.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A belt tension sensing system comprising:
   an engagement assembly operable to contact a belt while the belt is being driven in a drive direction, said engagement assembly is urged by the belt to move in a slack direction that is substantially perpendicular to the drive direction;
   a sensor coupled to said engagement assembly; and
   a control circuit in electronic communication with said sensor;
   said sensor adapted to produce a slack position signal based on a current position of said engagement assembly in the slack direction and to transmit said slack position signal to said control circuit; and
   wherein said control circuit is adapted to interpret said slack position signal to produce a tension measurement representative of the tension in the belt, and wherein said engagement assembly comprises a stationary fixed end and an idle roller configured to contact the belt, said idle roller coupled to a roller link, and wherein said idle roller and said roller link are constrained by said fixed end to only move in the slack direction.

2. The belt tension sensing system of claim 1, wherein said sensor comprises a tension sensor.

3. The belt tension sensing system of claim 1, wherein said sensor comprises a Hall Effect sensor.

4. The belt tension sensing system of claim 1, wherein said sensor comprises an infrared sensor.

5. The belt tension sensing system of claim 1, wherein said sensor comprises an optical sensor.

6. The belt tension sensing system of claim 1, wherein said engagement assembly comprises a fixed end configured to be coupled to a non-moving object such that the fixed end remains stationary.

7. The belt tension sensing system of claim 1, wherein said idle roller is configured to remain in contact with the belt while the belt is being driven.

8. The belt tension sensing system of claim 1, wherein said sensor is configured to bias said engagement assembly towards the belt in said slack direction.

9. The belt tension sensing system of claim 8, wherein said sensor comprises a pressure sensor.

10. The belt tension sensing system of claim 9, wherein said pressure sensor comprises a resilient member coupled between a moving end and a fixed end of said pressure sensor, wherein said moving end is configured to move synchronously with said roller link and said fixed end remains substantially stationary.

11. The belt tension sensing system of claim 10, wherein said resilient member is configured to bias said idle roller towards the belt in said slack direction.

12. The belt tension sensing system of claim 1, wherein said sensor is adapted to produce a plurality of said slack position signals and transmit said plurality of slack position signals to said control circuit, said control circuit adapted to interpret said plurality of slack position signals to produce said tension measurement.

13. The belt tension sensing system of claim 12, wherein said sensor is adapted to produce a continuous slack data string comprising a plurality of said slack position signals that are continuously transmitted to said control circuit, said control circuit adapted to interpret said slack data string to produce a continuous tension measurement data string comprising a plurality of said tension measurements.

14. The belt tension sensing system of claim 13, wherein said tension measurement data string is produced by calculating a rolling average based on a subset of said slack position signals of said slack data string.

15. A belt tension sensing system comprising:
   a pressure sensor;
   a control circuit in electronic communication with said pressure sensor; and
   an engagement assembly comprising:
      an idle roller configured to remain in contact with a belt while the belt is being driven in a drive direction; and
      a roller link comprising a proximal end coupled to said idle roller, and a distal end coupled to said pressure sensor;
   wherein while the belt is being driven in the drive direction, said idle roller and said roller link are urged by the belt to move in a slack direction that is substantially perpendicular to said drive direction;
   wherein said pressure sensor is configured to bias said engagement assembly towards the belt in the slack direction;
   wherein said pressure sensor is adapted to produce a continuous slack data string comprising a plurality of slack position signals, each of said slack position signals based on a position of a portion of said engagement assembly in the slack direction;
   wherein said slack data string is continuously transmitted by said pressure sensor to said control circuit; and wherein said control circuit is adapted to continuously interpret said slack data string to produce a continuous tension measurement data string comprising a plurality of tension measurements.

16. The belt tension sensing system of claim 15, wherein said tension measurement data string is produced by calculating a rolling average based on a subset of said slack position signals of said slack data string.

17. The belt tension sensing system of claim 15, wherein said pressure sensor comprises a resilient member coupled between a moving end and a fixed end of said pressure sensor, wherein said moving end is configured to move synchronously with said roller link and said fixed end remains substantially stationary.

18. The belt tension sensing system of claim 17, wherein said resilient member is configured to bias said roller link and said idle roller towards the belt in the slack direction.

19. The belt tension sensing system of any one of claim 17, wherein said pressure sensor further comprises a variable resistor having an electrical resistance that varies according to the distance between said fixed end and said moving end.

20. A method for sensing tension in a belt while the belt is being driven in a conveyance system, said method comprising:

positioning an engagement assembly in relation to the belt such that an idle roller of the engagement assembly remains in contact with the belt as the belt is driven in a drive direction, wherein the engagement assembly further comprises a stationary fixed end and a roller link coupled to said idle roller, and wherein said idle roller and said roller link are constrained by said fixed end to only move in a slack direction that is substantially perpendicular to the drive direction;

producing a plurality of slack position signals with a pressure sensor that is coupled to the idle roller, the slack position signals based on a position of a portion of the engagement assembly in the slack direction, the belt urging the portion of the engagement assembly to change position in the slack direction as the belt is driven;

transmitting the slack position signals to a control circuit;

calculating the tension of the belt with the control circuit based on the slack position signals; and using a resilient member to bias the idle roller towards the belt in the slack direction.

* * * * *